United States Patent
Komaki

(10) Patent No.: US 10,268,849 B2
(45) Date of Patent: Apr. 23, 2019

(54) BASKET WITH READER DEVICE FOR RFID TAG AND ARTICLE MANAGEMENT SYSTEM

(71) Applicant: Murata Manufacturing Co., Ltd., Nagaokakyo-shi, Kyoto-fu (JP)

(72) Inventor: Kunihiro Komaki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/030,016

(22) Filed: Jul. 9, 2018

(65) Prior Publication Data
US 2018/0314864 A1 Nov. 1, 2018

Related U.S. Application Data

(63) Continuation of application No. PCT/JP2017/006889, filed on Feb. 23, 2017.

(30) Foreign Application Priority Data

Mar. 14, 2016 (JP) ................................. 2016-049667

(51) Int. Cl.
*G06K 7/10* (2006.01)
*G06Q 30/06* (2012.01)

(52) U.S. Cl.
CPC ..... *G06K 7/10316* (2013.01); *G06K 7/10079* (2013.01); *G06Q 30/06* (2013.01)

(58) Field of Classification Search
CPC ................................................. G06K 7/10316
USPC .................... 235/451; 340/593.1, 10.1, 572.1
See application file for complete search history.

(56) References Cited

U.S. PATENT DOCUMENTS

| | | | | |
|---|---|---|---|---|
| 2009/0140850 A1* | 6/2009 | Kangas | ................. | G06Q 30/00 340/539.1 |
| 2010/0058398 A1* | 3/2010 | Ojala | .................. | H04L 12/2812 725/62 |
| 2010/0308970 A1* | 12/2010 | Rofougaran | ......... | H01Q 1/2283 340/10.1 |

(Continued)

FOREIGN PATENT DOCUMENTS

| | | |
|---|---|---|
| JP | H11-120438 A | 4/1999 |
| JP | 2000-259947 A | 9/2000 |

(Continued)

OTHER PUBLICATIONS

International Search Report issued for PCT/JP2017/006889, dated Mar. 21, 2017.

(Continued)

*Primary Examiner* — Allyson N Trail
(74) *Attorney, Agent, or Firm* — Arent Fox LLP

(57) ABSTRACT

A basket with a reader device including a basket main body that receives an article including an RFID tag having a dipole antenna attached thereto, and a reader device disposed on the basket main body and that reads the RFID tag. The reader device includes an RFIC element, and a cable-like antenna with one end connected to the RFIC element. The cable-like antenna is a ground radiation type cable-like antenna and the cable-like antenna is arranged in a circling manner around an axis passing through an opening portion of the basket main body.

20 Claims, 9 Drawing Sheets

(56) References Cited

U.S. PATENT DOCUMENTS

| | | | | |
|---|---|---|---|---|
| 2012/0256732 A1* | 10/2012 | McAllister | ............ | B65C 9/1865 340/10.2 |
| 2013/0304918 A1* | 11/2013 | Kneckt | ................ | H04W 48/16 709/225 |
| 2014/0313952 A1* | 10/2014 | Ghosh | ...................... | H04L 1/00 370/311 |
| 2017/0077588 A1 | 3/2017 | Fukuda | | |
| 2017/0161531 A1 | 6/2017 | Komaki et al. | | |

FOREIGN PATENT DOCUMENTS

| | | |
|---|---|---|
| JP | 2004-265111 A | 9/2004 |
| JP | 2014-38552 A | 2/2014 |
| WO | WO 2015/133051 A1 | 9/2015 |
| WO | WO 2016/027686 A1 | 2/2016 |

OTHER PUBLICATIONS

Written Opinion of the International Searching Authority issued for PCT/JP2017/006889, dated Mar. 21, 2017.

* cited by examiner

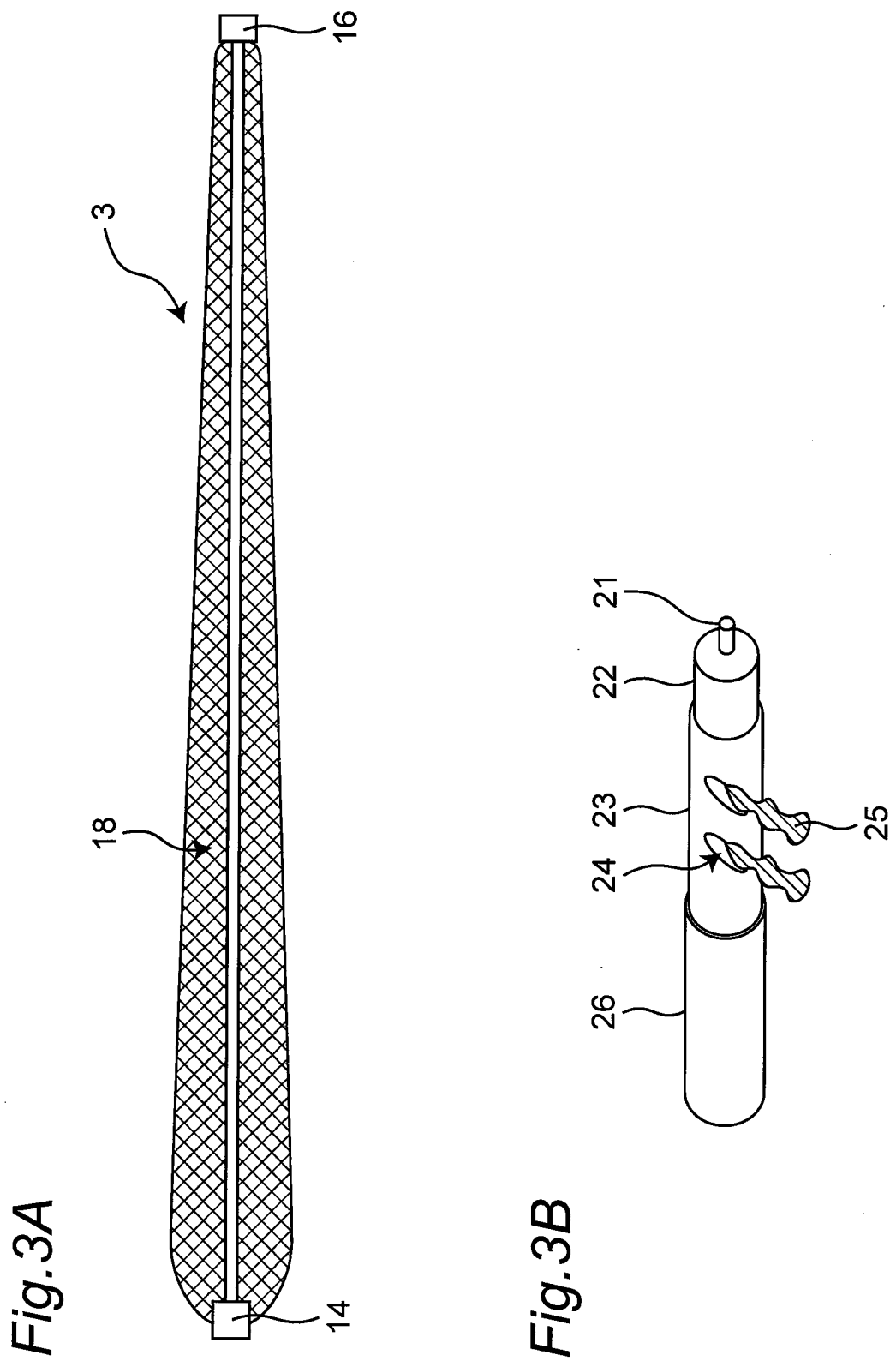

BASKET WITH READER DEVICE FOR RFID TAG AND ARTICLE MANAGEMENT SYSTEM

CROSS REFERENCE TO RELATED APPLICATIONS

The present application is a continuation of PCT/JP2017/006889 filed Feb. 23, 2017, which claims priority to Japanese Patent Application No. 2016-049667, filed Mar. 14, 2016, the entire contents of each of which are incorporated herein by reference.

TECHNICAL FIELD

The present disclosure relates to a basket with a reader device for an RFID tag and an article management system using the basket.

BACKGROUND

A POS ("Point of Sale") system is a typical merchandise management system in a store. In the current POS system, when an item is sold, i.e., when payment is completed, sales information thereof is recorded in a database for the first time. Therefore, for example, when an item is in a shopping basket before payment, this leads to a situation in which the item is not on a store shelf although the item is supposed to be in stock.

In this regard, for example, in a disclosed merchandise management system, a reader/writer is attached to a shopping basket itself to manage a tagged item in the shopping basket before payment (see, e.g., Patent Document 1). This system can also manage items remaining in a store.

Patent Document 1: Japanese Laid-Open Patent Publication No. 2004-292143.

However, in the configuration described above, if items placed in a shopping basket are stacked (tags are stacked), or an item or a package contains metal, radiation characteristics of an antenna are degraded in each tag, which makes it difficult to read a tagged item in the shopping basket.

SUMMARY OF THE INVENTION

It is therefore an object of the present disclosure to provide a basket with a reader device making it easier to read a tagged item in a basket such as a shopping basket.

According to an exemplary embodiment of the present disclosure, a basket is provided with a reader device that includes a basket main body that receives an article including an RFID tag having a dipole antenna attached thereto; and a reader device disposed on the basket main body, that reads the RFID tag. Moreover, the reader device includes an RFIC element; and a cable-like antenna having one end connected to the RFIC element, wherein the cable-like antenna is a ground radiation type cable-like antenna, and the cable-like antenna is arranged in a circling manner around an axis passing through an opening portion of the basket main body.

According to another exemplary embodiment of the present disclosure, an article management system includes a basket with a reader device; an external-side short-range wireless communication device; and a host computer connected to the external-side short-range wireless communication device. Moreover, the basket includes a basket main body that receives an article including an RFID tag having a dipole antenna attached thereto; a reader device disposed on the basket main body, that reads the RFID tag; and a basket-side short-range wireless communication device connected to the reader device, and that communicates with the outside. Yet further, the reader device includes an RFIC element; and a cable-like antenna having one end connected to the RFIC element, wherein the cable-like antenna is a ground radiation type cable-like antenna, and the cable-like antenna is arranged in a circling manner around an axis passing through an opening portion of the basket main body. Moreover, the external-side short-range wireless communication device communicates with the basket-side short-range wireless communication device, and information of the RFID tag of the article placed in the basket with a reader device is transmitted through an RFID system made up of the RFID tag and the cable-like antenna as well as a short-range wireless communication system made up of the external-side short-range wireless communication device and the basket-side short-range wireless communication device to the host computer.

According to the basket with a reader device of the present disclosure, since the cable-like antenna is used, a tagged item in the basket such as a shopping basket is easily read.

BRIEF DESCRIPTION OF THE DRAWINGS

FIG. 3A is a schematic of an example of a wireless reachable area of a leaky coaxial cable antenna and FIG. 3B is a partial enlarged view of the leaky coaxial cable antenna of FIG. 3A.

DETAILED DESCRIPTION

Figure 1:
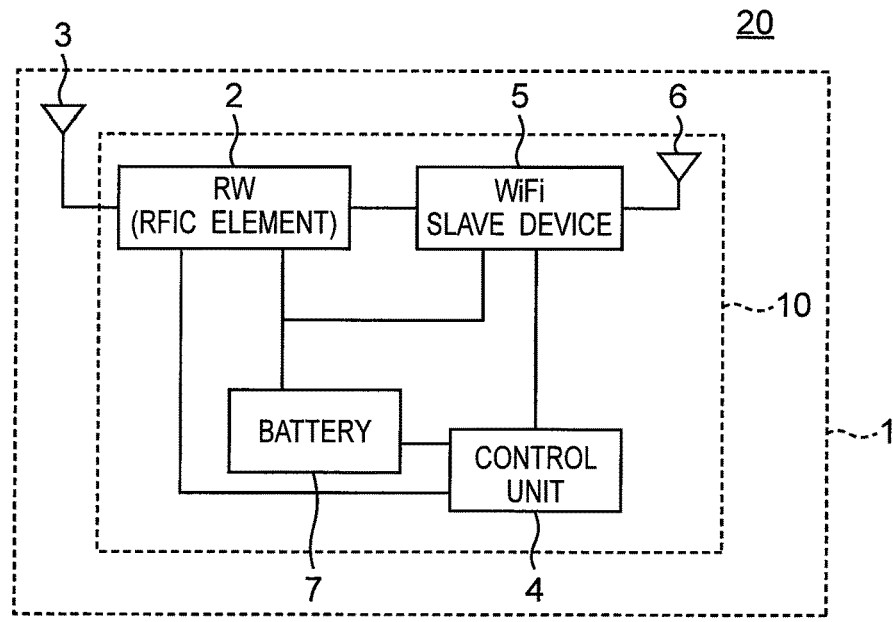
FIG. 1 is a block diagram of a configuration of a basket with a reader device according to a first exemplary embodiment.

According to a first exemplary aspect, a basket with a reader device includes a basket main body that receives an article including an RFID tag having a dipole antenna attached thereto; and a reader device disposed on the basket main body, that reads the RFID tag. Moreover, the reader device includes an RFIC element; and a cable-like antenna having one end connected to the RFIC element, wherein the cable-like antenna is a ground radiation type cable-like antenna, and the cable-like antenna is arranged in a circling manner around an axis passing through an opening portion of the basket main body.

Further, as the basket with a reader device of a second exemplary aspect, the cable-like antenna is arranged to extend from a surface provided with the RFIC element over a surface different from the surface provided with the RFIC element.

Further, as the basket with a reader device of a third exemplary aspect, the cable-like antenna is further disposed along a bottom surface of the basket main body.

Further, as the basket with a reader device of a fourth exemplary aspect, the basket main body has a receiving portion that receives the article through the opening portion of the basket main body, and the cable-like antenna is helically arranged in the receiving portion.

Further, as the basket with a reader device of a fifth exemplary aspect, the cable-like antenna has a signal line having one end connected to the RFIC element, a ground disposed along the signal line and having openings at predetermined intervals along the signal line, and a terminator disposed at the other end.

Further, as the basket with a reader device of a sixth exemplary aspect, the cable-like antenna has a signal line having one end connected to the RFIC element, a ground disposed along the signal line, and a matching device disposed at the other end and connected between the signal line and the ground.

Further, as the basket with a reader device of a seventh exemplary aspect, a basket-side short-range wireless communication device is included and connected to the reader device, wherein the basket-side short-range wireless communication device communicates with an external-side short-range wireless communication device.

Further, as the basket with a reader device of a eighth exemplary aspect, the basket-side short-range wireless communication device is a short-range wireless communication system using the UHF band or the SHF band and communicates with the external-side short-range wireless communication device.

According to a ninth exemplary aspect, an article management system is provided that includes a basket with a reader device; an external-side short-range wireless communication device; and a host computer connected to the external-side short-range wireless communication device. Moreover, the basket includes a basket main body that receives an article including an RFID tag having a dipole antenna attached thereto; a reader device disposed on the basket main body, that reads the RFID tag; and a basket-side short-range wireless communication device connected to the reader device, and that communicates with the outside. Yet further, the reader device includes an RFIC element; and a cable-like antenna having one end connected to the RFIC element, wherein the cable-like antenna is a ground radiation type cable-like antenna, and the cable-like antenna is arranged in a circling manner around an axis passing through an opening portion of the basket main body, wherein the external-side short-range wireless communication device communicates with the basket-side short-range wireless communication device, and wherein information of the RFID tag of the article placed in the basket with a reader device is transmitted through an RFID system made up of the RFID tag and the cable-like antenna as well as a short-range wireless communication system made up of the external-side short-range wireless communication device and the basket-side short-range wireless communication device to the host computer.

Further, as the basket with a reader device of a tenth exemplary aspect, the cable-like antenna is arranged in a circling manner adjacent to the opening portion of the basket main body.

Further, as the article management system of a eleventh exemplary aspect, the cable-like antenna is arranged in a circling manner adjacent to the opening portion of the basket main body.

A basket with a reader device and an article management system according to exemplary embodiments will now be described with reference to the accompanying drawings. In the drawings, substantially the same members are denoted by the same reference numerals.

First Embodiment

Figure 2:
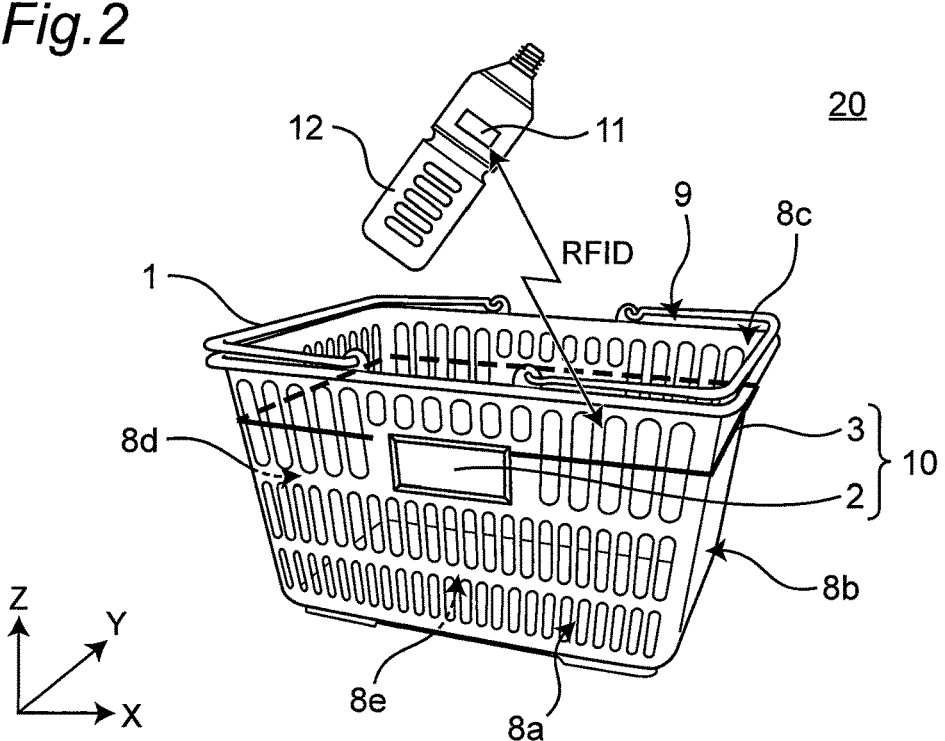
FIG. 2 is a schematic perspective view of a configuration of a shopping basket with a reader device that is an example of the basket with a reader device of FIG. 1.

FIG. 1 is a block diagram of a configuration of a basket 20 with a reader device according to a first exemplary embodiment. FIG. 2 is a schematic perspective view of a configuration of a shopping basket 20 with a reader device that is an example of the basket with a reader device of FIG. 1.

As shown, the basket 20 with a reader device includes a basket main body 1 that receives an article 12 having an RFID tag 11 attached thereto, and a reader device 10 for reading the RFID tag 11. The reader device 10 includes an RFIC element 2 and a cable-like antenna 3 having one end connected to the RFIC element 2 and arranged on at least a portion of surfaces forming the basket main body 1.

This basket 20 with a reader device has the cable-like antenna 3 arranged on at least a portion of the surfaces forming the basket main body 1. The cable-like antenna 3 is a leaky coaxial cable antenna, for example. This enables reading of the RFID tag 11 passing through an outlet opening (opening portion) 9 of the basket main body 1 and received in the basket main body 1.

The leaky coaxial cable antenna 3 may be arranged to circle around and surround a receiving portion of the basket main body 1. When the leaky coaxial cable antenna 3 is arranged to circle around, radio waves are radiated from the circling leaky coaxial cable antenna 3 in various directions. Therefore, if the item 12 is stacked in the basket main body 1, i.e., even if the RFID tag 11 is stacked, the tag is highly possibly read from any of the directions, and the reading accuracy of the RFID tag 11 can be improved. Additionally, since the cable-like antenna 3 is used, interference does not occur even if the antenna is arranged to circle around. Therefore, even if the item 12 or a package thereof contains metal, the tag can be read from a direction not affected by shielding by the metal, the reading accuracy of the RFID tag 11 is not reduced.

The leaky coaxial cable antenna 3 is a traveling-wave antenna and is not a resonance antenna. Therefore, even if another basket 20 or a metal object is present nearby, the reading characteristic does not significantly deteriorate. Furthermore, the traveling-wave antennas of the respective baskets 20 do not interfere with each other. Therefore, a possibility of wrongly reading the contents of the nearby basket 20 is small.

The reader device 10 forming the basket 20 with a reader device may further include an antenna 6 and a wireless LAN slave device 5 for communicating with a wireless LAN master device disposed in a store. A control unit 4, a battery 7, etc. may further be included.

According to the basket 20 with a reader device, when the item 12 is put into the basket 20 with a reader device, the information thereof is read by the reader device 10, and the read information is transmitted through communication between the wireless LAN slave device 5 and the master device to a host computer. When the item 12 is put into the basket 20 with a reader device, the information is reflected in the database, so that stock information can be comprehended in real time. At the time of payment, the information of the item 12 placed in the basket 20 with a reader device is already comprehended, a payment process can be simplified.

The elements forming the basket 20 with a reader device according to an exemplary aspect will hereinafter be described.

<Basket Main Body>

The basket main body 1 may be a shopping basket as shown in FIG. 2, for example. The basket main body 1 can receive an article 12 through an outlet opening (opening portion) 9. For example, the basket main body 1 may have a rectangular parallelepiped shape with a top surface opened as the outlet opening 9. The basket main body 1 may be made of resin, wood, or bamboo, for example. The basket main body 1 may be either a plate-like form or a mesh-like form. In the case of the mesh-like form, the basket main body may be made of metal. Alternatively, the basket main body may be a composite body of resin and metal. A handle is also included in the basket main body 1.

The basket main body 1 has side surfaces 8a, 8b, 8c, 8d surrounding the outlet opening 9 on the top surface, and a bottom surface 8e. The side surface 8a and the side surface 8c are surfaces opposed to each other in the Y direction, and the side surface 8b and the side surface 8d are surfaces opposed to each other in the X direction.

The basket main body 1 may have any receiving portion capable of receiving the article 12 and may be a shopping cart, for example. When the basket main body is made of metal, the cable-like antenna is preferably guided along the inside of the basket main body.

<Reader Device>

The reader device 10 includes the RFIC element 2 and the cable-like antenna 3 having one end connected to the RFIC element 2 and arranged on at least a portion of the surfaces forming the basket main body 1.

<RFIC Element>

The RFIC element 2 is an RFIC element on the reader device side and communicates with the RFID tag 11 attached to the article 12 via the cable-like antenna 3. The RFID tag 11 has an RFIC element (tag-side RFIC element) and an antenna connected to the RFIC element. The reader device 10 and the RFID tag 11 form an RFID system according to an exemplary aspect. This RFID system is a UHF band RFID system using the 900 MHz band as a communication frequency band.

<Cable-Like Antenna>

The cable-like antenna 3 is a leaky coaxial cable antenna, for example. The cable-like antenna 3 is not limited to a leaky coaxial cable antenna and may be a leaky waveguide antenna, for example. Furthermore, as shown in a fifth embodiment described later, the antenna may be a ground radiation type cable-like antenna. Among the cable-like antennas, the leaky coaxial cable antenna will hereinafter be described.

<Leaky Coaxial Cable Antenna>

FIG. 3A is a schematic of an example of a wireless reachable area 18 of the leaky coaxial cable antenna 3. FIG. 3B is a partial enlarged view of the leaky coaxial cable antenna 3 of FIG. 3A. The leaky coaxial cable antenna 3 is a reader antenna of the RFID tag 11. The leaky coaxial cable antenna 3 is connected to a power feeding end 14 and reaches a terminator 16.

Figure 7:
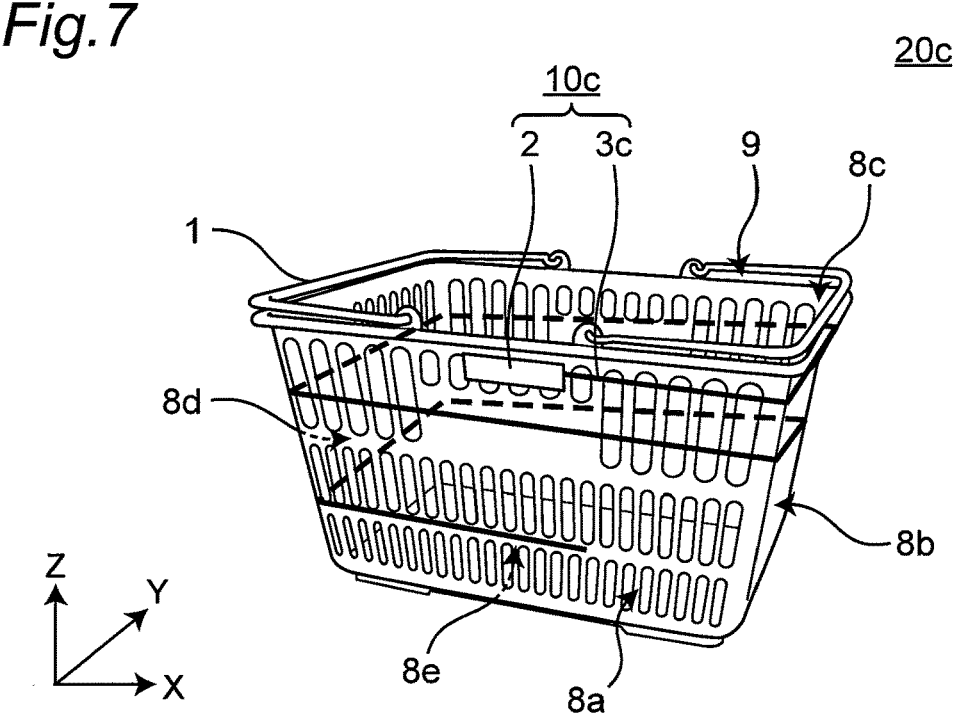
FIG. 7 is a schematic perspective view of a configuration of a shopping basket with a reader device according to a second exemplary embodiment.
Figure 8:
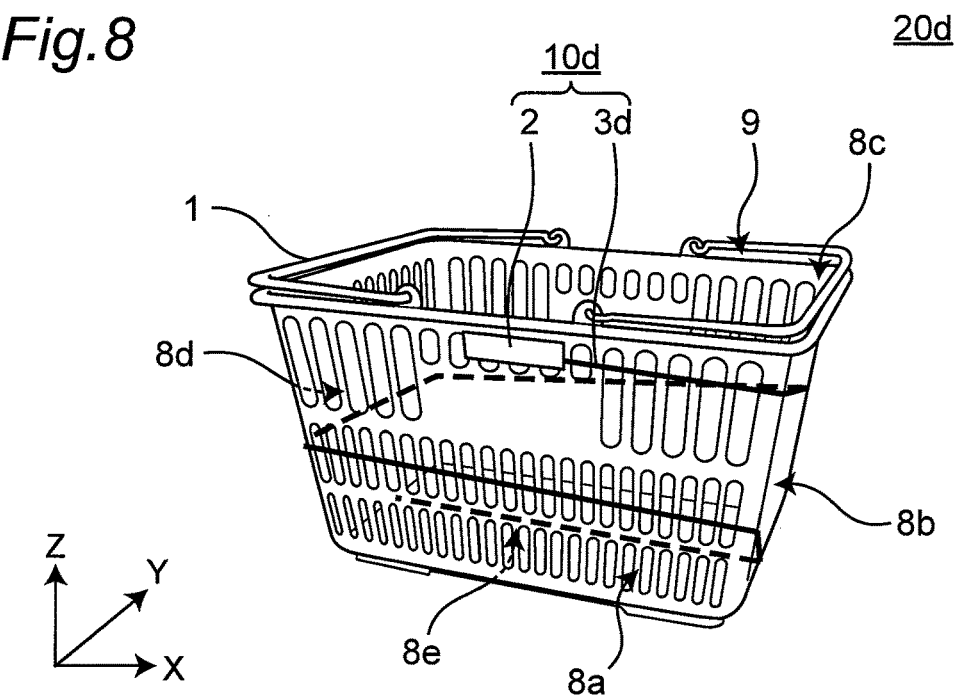
FIG. 8 is a schematic perspective view of a configuration of a shopping basket with a reader device according to a third exemplary embodiment.
Figure 9:
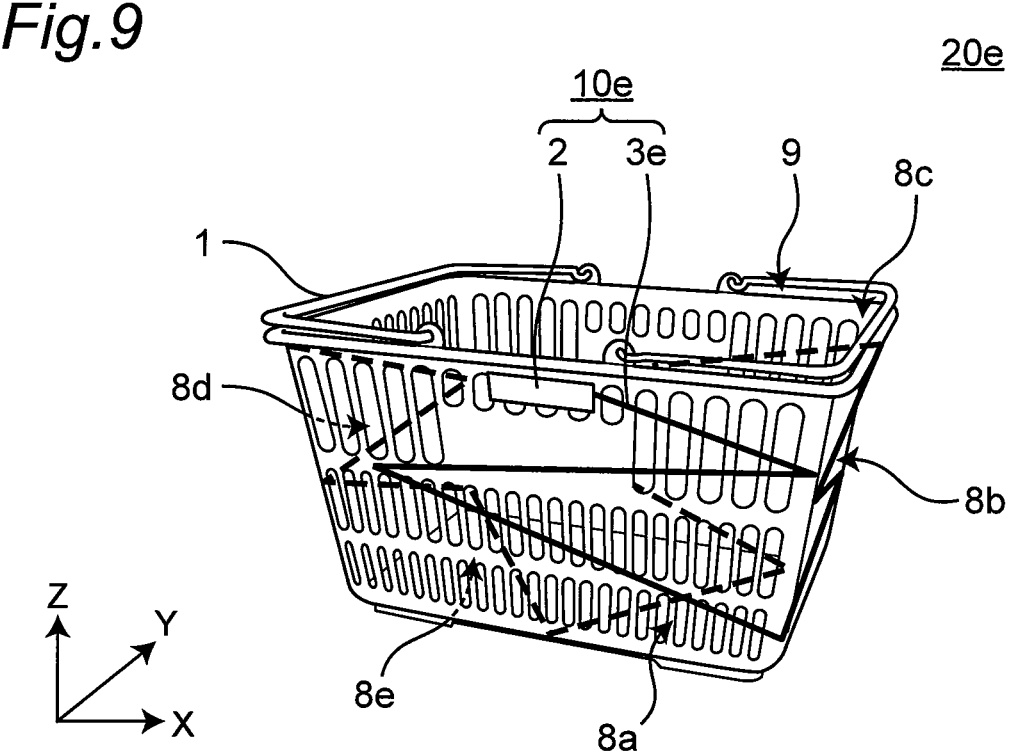
FIG. 9 is a schematic perspective view of a configuration of a shopping basket with a reader device according to a fourth exemplary embodiment.

The leaky coaxial cable antenna 3 may be arranged on at least a portion of the surfaces forming the basket main body 1. The antenna may be arranged over two of the surfaces forming the basket main body 1. Specifically, the leaky coaxial cable antenna 3 may be arranged to extend from a surface provided with the RFIC element over a surface different from the surface provided with the RFIC element. The antenna may further be arranged along the bottom surface 8e of the basket main body 1. The surfaces forming the basket main body 1 correspond to, for example, respective surfaces when the basket main body 1 is formed as a polyhedron. On the other hand, when the basket main body 1 is made up of surfaces including a curved surface, the surfaces correspond to surfaces acquired by approximation with a circumscribed or inscribed polyhedron. For example, as shown in FIG. 2, the leaky coaxial cable antenna 3 is arranged along the inner surfaces 8a, 8b, 8c, 8d of the basket main body 1. It is noted that the phrase "arranged along the inner surfaces" as used herein includes not only the when the antenna is disposed or configured along the side surfaces 8a, 8b, 8c, 8d and the bottom surface 8e of the basket main body 1, but also when the antenna is disposed or configured along only the side surfaces 8a, 8b, 8c, 8d. When the antenna is disposed along the side surfaces 8a, 8b, 8c, 8d, the leaky coaxial cable antenna 3 is disposed to circle around in a circumferential shape or a helical shape inside the side surfaces 8a, 8b, 8c, 8d surrounding the opening portion 9 of the basket main body 1 according to an exemplary aspect. In this case, the arrangement of the leaky coaxial cable antenna 3 may be performed not only as show in in FIG. 2 but also as shown in FIGS. 7 to 9 according to second to fourth embodiments described later. Since the articles in the basket main body are distributed densely at the bottom and coarsely on the upper side, and the leaky coaxial cable antenna has a larger communication distance on the power feeding side (base side), the antenna is preferably wound upward from the bottom to the top of the basket main body 1.

The leaky coaxial cable antenna 3 may be incorporated in the basket main body 1 itself.

The leaky coaxial cable antenna 3 is a wire-like or belt-like cable type antenna and may be any antenna forming a uniform electromagnetic field strength along an extending direction. This leaky coaxial cable antenna is a coaxial cable having a center conductor (core wire) 21 (i.e., a signal line), an insulator 22, and an external conductor (external conductor) 23 configured in a coaxial shape as shown in FIG. 3B, for example, and is a coaxial cable type antenna having opening portions 24 periodically disposed in the external conductor 23. As shown in FIG. 3B, a sheath 26 is further coaxially disposed on the outside. The terminator 16 is disposed at the terminal end of the leaky coaxial cable antenna 3. The center conductor 21 is continuously disposed in the extending direction of the leaky coaxial cable antenna 3, while the insulator 22, the external conductor 23, and the sheath 26 are opened at opening portions 24 disposed at intervals of predetermined length. Therefore, the leaky coaxial cable antenna 3 has the opening portions 24 at intervals of predetermined length, and the center conductor 21 is exposed outside in the opening portions 24. The leaky coaxial cable antenna 3 shown in FIG. 3A has a circular cross section orthogonal to the extending direction. For example, the material of the center conductor 21 and the external conductor 23 is copper, the material of the insulator 22 is foamed polyethylene, and the material of the sheath 26 is flame-retardant polyethylene. These materials are merely examples, and the exemplary embodiments of the present disclosure should not limited to these materials.

As further shown in FIG. 3B, holes are periodically disposed in the external conductor 23 of the coaxial cable to form the leaky coaxial cable antenna. The holes are not limited to round holes and may be holes having a rectangular shape, an elliptical shape, etc. Furthermore, the rectangular or elliptical holes may be perpendicular, horizontal, or inclined relative to the extending direction. Alternatively, the external conductor 23 may be provided with the opening portions 24 opened along the extending direction. A portion of a high-frequency signal propagating through the leaky coaxial cable antenna 3 leaks from the opening portions 24 as an electromagnetic wave.

The opening portions 24 are preferably disposed toward the inside of the basket main body 1.

When the direction orthogonal to the line drawn by the leaky coaxial cable antenna 3 is 0° with the terminator 16 side and the power supply side defined as +θ and −θ, respectively, the electromagnetic wave is often radiated at a slant in the +θ direction when radiated. However, since the multiple radiation sources are present and arranged in accordance with the shape of the cable, the plane of polarization of leaked electromagnetic waves is not fixed. The leaky electromagnetic field of the leaky coaxial cable antenna 3 is at most about 1 m in the direction perpendicular to the extending direction of the cable (extremely short distance).

The leaky coaxial cable antenna 3 preferably has flexibility, i.e., is flexible. For example, the extending direction can be changed in a certain plane, and the antenna can be bent at least at one position. The antenna may not only be bent at a steep angle but also gradually be curved according to an exemplary aspect. The leaky coaxial cable antenna 3 may have a linear shape, an L-shape, an open-top box shape (U shape) acquired by combining an L shape and I shape, or a spiral shape (swirling shape). Furthermore, the leaky coaxial cable antenna 3 is not limited to one line and may be branched into two or more lines. This increases the degree of freedom in design so that the leaky coaxial cable antenna 3 can be extend in different directions depending on the shape of the basket main body 1 and the necessary electromagnetic field strength, and an appropriate layout can be achieved.

Even if the size of the basket main body 1 is changed, the same leaky coaxial cable antenna 3 can be used. Therefore, the leaky coaxial cable antenna 3 has high degrees of freedom in length and arrangement location.

As described above, the leaky coaxial cable antenna 3, i.e., the cable-like antenna, has only the area close to the line drawn along the extending direction as the readable area. Additionally, the electromagnetic wave radiated by the leaky coaxial cable antenna 3 has a uniform electromagnetic field strength along the extending direction. By arranging the leaky coaxial cable antenna 3 having such characteristics along the inner surface of the basket main body 1, an appropriate electromagnetic field strength can be achieved throughout the inside of the basket main body 1. Since the leaky coaxial cable antenna 3 generates an electromagnetic field over a narrow range in the radial direction, the electromagnetic field abruptly weakens from the outer surface of the basket main body 1 toward the outside. This reduces the risk of wrongly reading an RFID tag not placed in the basket main body 1.

<Wireless LAN Slave Device>

The wireless LAN slave device 5 is a device for communicating with the wireless LAN master device. The wireless LAN slave device 5 may communicating with the wireless LAN master device in the UHF band or the SHF band. The wireless LAN slave device and the wireless LAN master device form a short-range wireless communication system according to an exemplary aspect. This short-range wireless communication system is a short-range wireless communication system having a communication distance of about 10 m to 100 m and use the communication frequency band of 2.4 GHz band or 5 GHz band. Therefore, since the communication frequency band and the strength and property of radio waves are different from the RFID system using the 900 MHz band described above, almost no interference occurs between the short-range wireless communication system and the RFID system. The antenna used in this short-range wireless communication system is a resonance antenna. The short-range wireless communication system may be implemented by using a wireless LAN system typified by WiFi or a Bluetooth (registered trademark) system.

<Article Having RFID Tag Attached Thereto>

Description will be made of the article 12 having the RFID tag 11 attached thereto.

<RFID Tag>

Figure 4A:
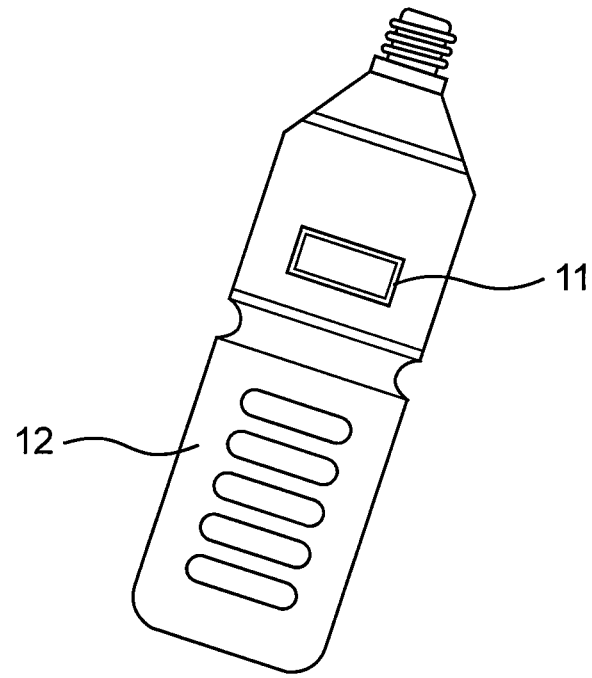
FIG. 4A is a schematic of an article having an RFID tag 11 attached thereto and FIG. 4B is a schematic of an example of the RFID tag of FIG. 4A.
Figure 4B:
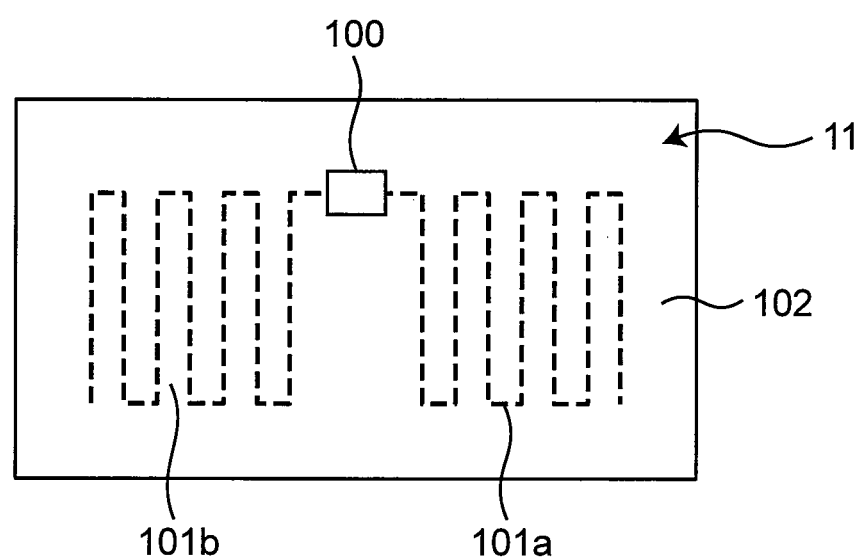

FIG. 4A is a schematic of the article 12 having the RFID tag 11 attached thereto. FIG. 4B is a schematic of an example of the RFID tag 11 of FIG. 4A.

As shown in FIG. 4A, this RFID tag 11 is attached to a PET bottle that is the article 12. In this embodiment, the RFID tag 11 is directly attached to the article 12; however, exemplary embodiment of the present disclosure should not be limited thereto, and the tag may be associated by a wire, for example. The RFID tag 11 is made up of an RFIC chip 100, a dipole antenna including two antenna elements 101a, 101b extending in a meander shape on both sides thereof, and a cover material 102 sandwiching the RFIC chip 100 and the antenna elements 101a, 101b. The antenna may be a linear dipole antenna that is not meander-shaped. Alternatively, the antenna may be a loop antenna. The configuration of the antenna element of the RFID tag 11 may appropriately be selected depending on the frequency band of communication. The RFIC chip may be packaged together with a matching circuit. Additionally, for example, a price and a brand name are printed on a surface of a cover material. The RFID tag 11 is normally attached to the article 12 or physically connected by stringing etc.; however, the present invention is not limited thereto. For example, the RFID tag 11 and the article 12 may physically be separated and may separately be arranged. In this case, the RFID tag 11 may be associated with the article 12.

<Article>

The article (item) 12 having the RFID tag 11 attached thereto may be any article placed inside the basket main body 1 and managed by the RFID tag 11. For example, the article 12 may be food, tableware, a container, a small article, etc. Even articles such as jewelry, tableware, etc.

requiring careful handling can be managed in terms of stock management and security before payment without directly touching the articles.

<Article Management System>

Figure 5:
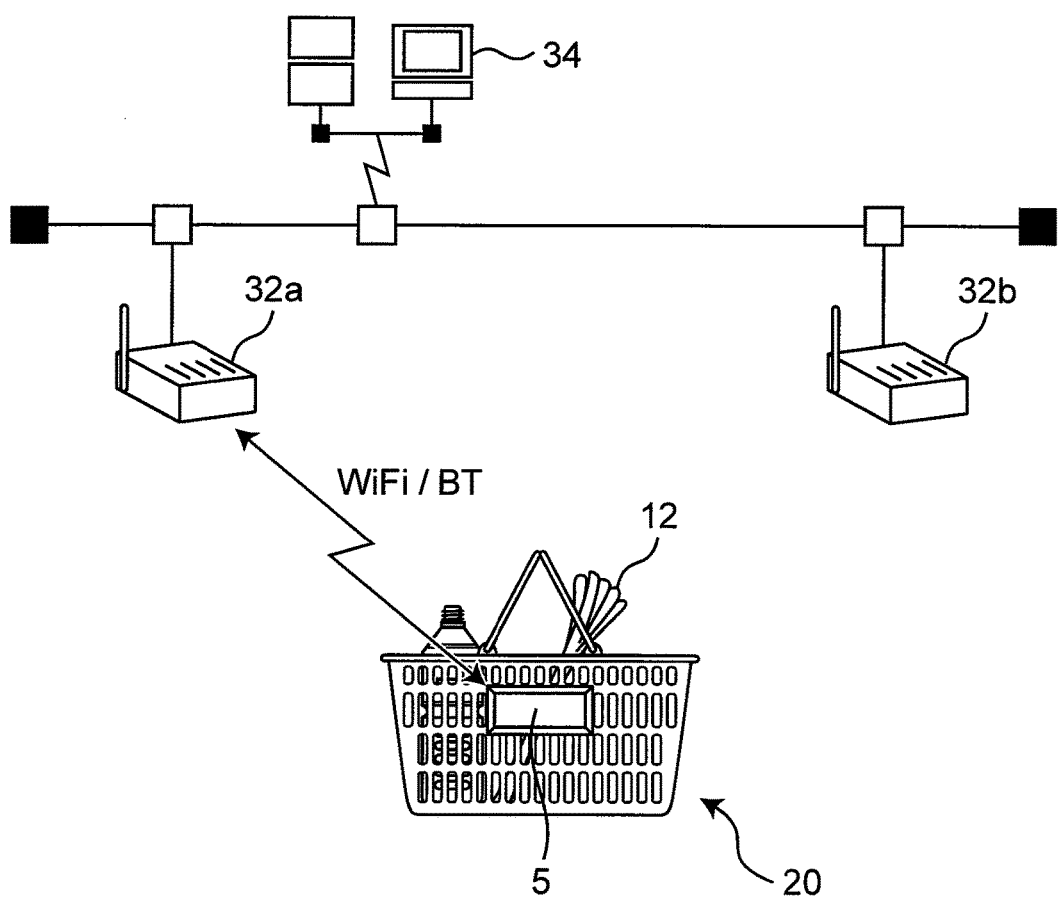
FIG. 5 is a schematic of a configuration of an article management system having a basket with a reader device and a wireless LAN master device capable of communicating with each other.
Figure 6:
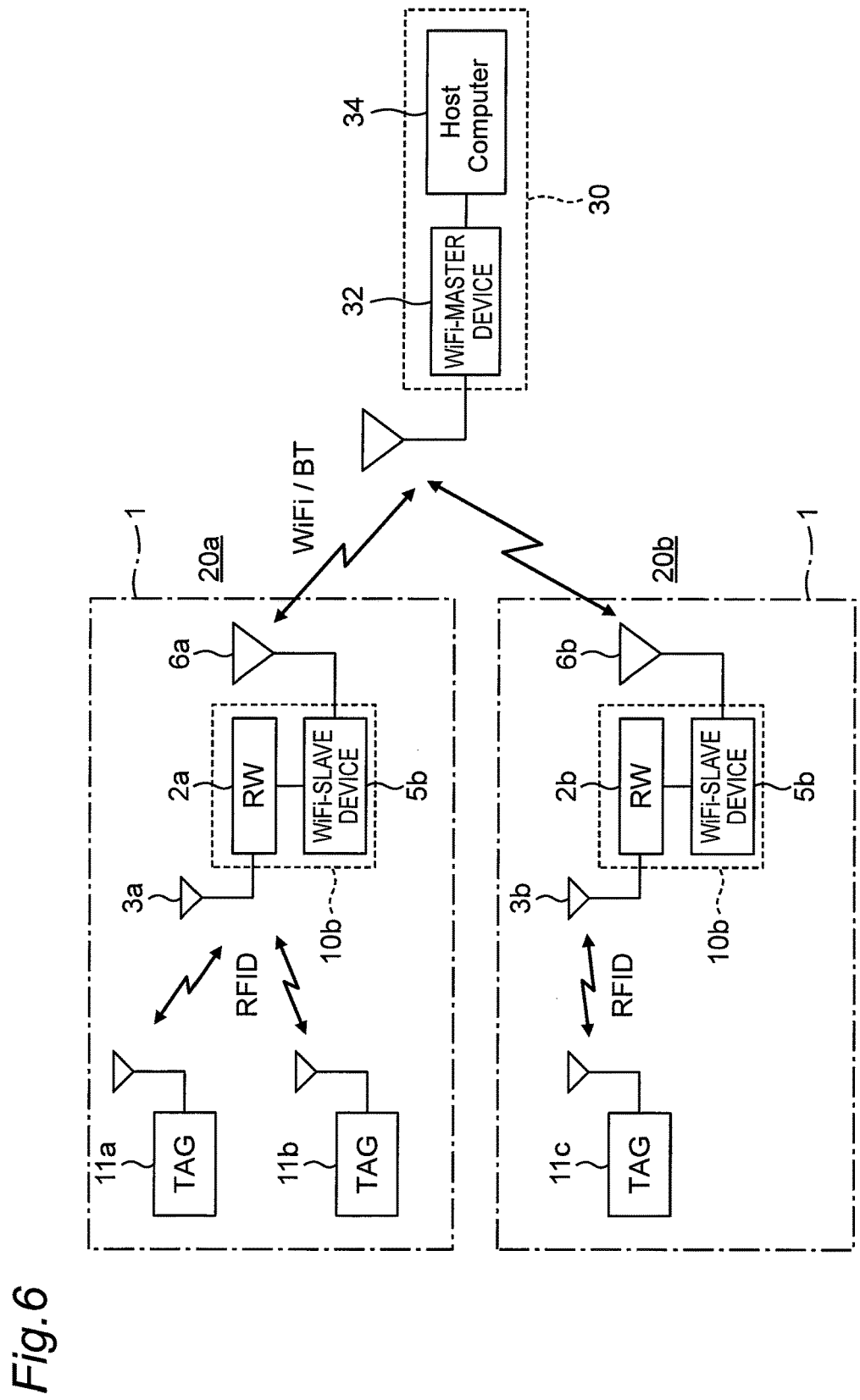
FIG. 6 is a block diagram of a configuration of the article management system of FIG. 5.

FIG. 5 is a schematic of a configuration of an article management system having the basket 20 with a reader device and wireless LAN master devices 32a, 32b capable of communicating with each other. FIG. 6 is a block diagram of a configuration of the article management system of FIG. 5.

This article management system includes baskets 20, 20a, 20b with reader devices, and a master communication module 30. The baskets 20, 20a, 20b with reader devices receive articles 12 having the RFID tags 11a, 11b, 11c attached thereto and have reader devices 10a, 10b for reading the RFID tags 11a, 11b, 11c, and wireless LAN slave devices 5, 5a, 5b connected to the reader devices 10a, 10b and communicating with the outside. The master communication module 30 has wireless LAN master devices 32, 32a, 32b communicating with wireless LAN slave devices 5, 5a, 5b, and a host computer 34 connected to the wireless LAN master devices 32, 32a, 32b. In this article management system, the information of the RFID tag of the article placed in the basket 20 with a reader device is transmitted through the RFID system made up of the RFID tag and the cable-like antenna as well as the wireless LAN system made up of the wireless LAN slave devices 5, 5a, 5b and the master devices 32, 32a, 32b, to the host computer 34.

According to this article management system, when the items 12 having the RFID tags 11a, 11b, 11c attached thereto are put into the baskets 20, 20a, 20b with reader devices, the information is transmitted to the host computer 34 and reflected in a database. Therefore, inventory information can be comprehended in real time for the items 12 including not only items on display shelves but also the items 12 placed in the baskets 20, 20a, 20b with reader devices. At the time of payment, the information of the items 12 placed in the baskets 20, 20a, 20b with reader devices is already comprehended, a payment process can be simplified.

Second Embodiment

FIG. 7 is a schematic perspective view of a configuration of a shopping basket 20c with a reader device according to a second embodiment. This shopping basket 20c with a reader device is different from the shopping basket with a reader device according to the first embodiment in that a leaky coaxial cable antenna 3c is attached in a surrounding manner around the receiving portion of the basket main body 1. Specifically, the leaky coaxial cable antenna 3c is attached while helically circling around twice from the upper side of the side surface 8a of the basket main body 1 over the side surfaces 8b, 8c, 8d, 8a, 8b, 8c, 8d, 8a before terminated. As a result, the leaky coaxial cable antenna 3c is disposed to surround the side surfaces of the basket main body 1, so that the reading accuracy of the RFID tag 11 attached to the item 12 received in the basket main body 1 is further improved.

Third Embodiment

FIG. 8 is a schematic perspective view of a configuration of a shopping basket 20d with a reader device according to a third embodiment. This shopping basket 20d with a reader device is different from the shopping basket with a reader device according to the first embodiment in that a leaky coaxial cable antenna 3d is attached in a surrounding manner around the housing portion of the basket main body 1 and along the bottom surface 8e. Specifically, the leaky coaxial cable antenna 3d is attached while helically circling around 1.5 times from the upper side of the side surface 8a of the basket main body 1 over the side surfaces 8b, 8c, 8d, 8a, 8b before reaching the lower side and then extending along the bottom surface 8e before terminated. As a result, the leaky coaxial cable antenna 3d is disposed to surround the side surfaces and the bottom surface of the basket main body 1, so that the reading accuracy of the RFID tag 11 attached to the item 12 received in the shopping basket 20d with a reader device is further improved.

Fourth Embodiment

FIG. 9 is a schematic perspective view of a configuration of a shopping basket 20e with a reader device according to a fourth embodiment. This shopping basket 20e with a reader device is different from the shopping basket with a reader device according to the first embodiment in that a leaky coaxial cable antenna 3e is attached in a surrounding manner over the side surfaces and the bottom surface. Specifically, the leaky coaxial cable antenna 3e is attached in a back-and-forth manner between the upper side and the lower side of each of the side surfaces 8a, 8b, 8c, 8d and in a back-and-forth manner between both ends of the bottom surface 8e. As a result, the leaky coaxial cable antenna 3e is disposed to surround the side surfaces and the bottom surface of the basket main body 1, so that the reading accuracy of the RFID tag 11 attached to the item 12 received in the shopping basket 20e with a reader device is further improved.

Fifth Embodiment

Figure 10A:
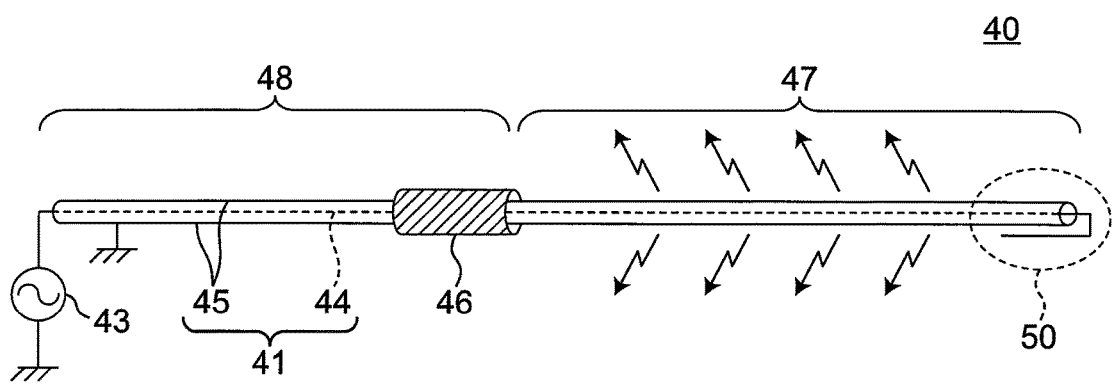
FIG. 10A is a schematic configuration view of a configuration of a ground radiation type cable-like antenna that is an example of a cable-like antenna of a reader device forming a basket with a reader device according to a fifth exemplary embodiment.
Figure 10B:
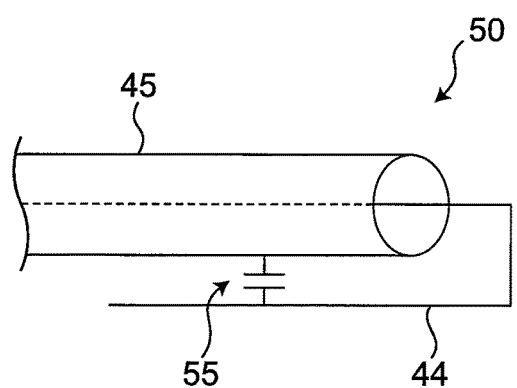
FIG. 10B is a schematic of a matching circuit part included in the ground radiation type cable-like antenna of FIG. 10A.
Figure 11A:
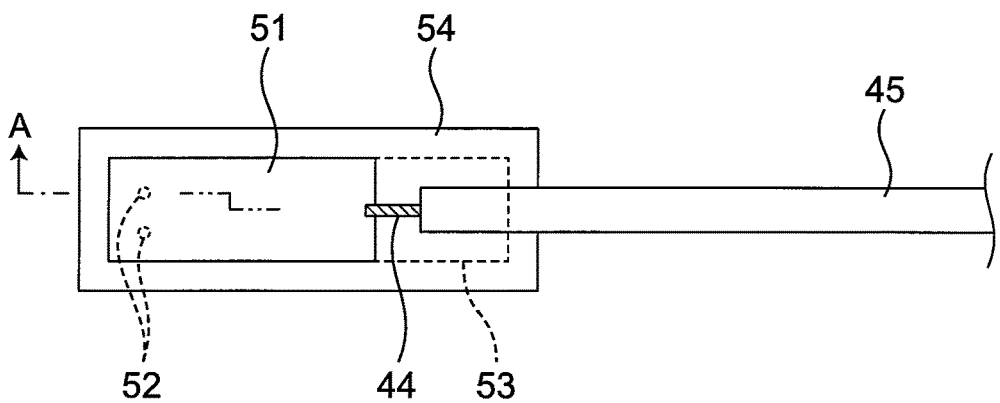
FIG. 11A is a plan view of the matching circuit part.
Figure 11B:
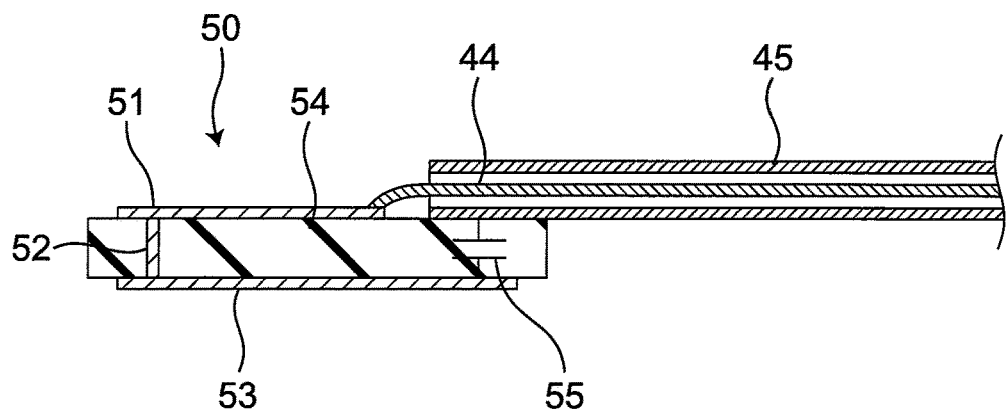
FIG. 11B is a cross-sectional view taken along a line A-A of FIG. 11A.
Figure 11C:
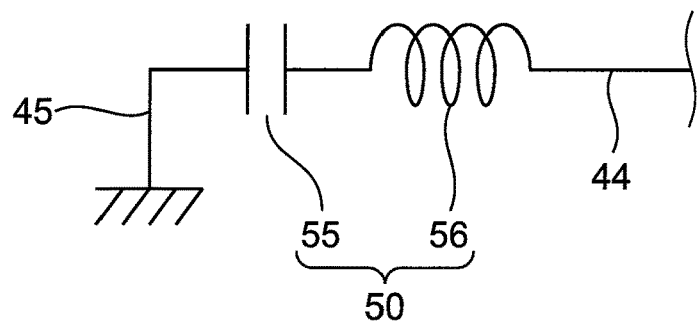
FIG. 11C is an equivalent circuit diagram of the matching circuit part included in the cable-like antenna of FIG. 11A.

FIG. 10A is a schematic configuration view of a configuration of a ground radiation type cable-like antenna 40 that is an example of a cable-like antenna of a reader device forming a basket with a reader device according to a fifth embodiment. FIG. 10B is a schematic of a matching circuit part 50 included in the ground radiation type cable-like antenna of FIG. 10A. FIG. 11A is a plan view of the matching circuit part 50. FIG. 11B is a cross-sectional view taken along a line A-A of FIG. 11A. FIG. 11C is an equivalent circuit diagram of the matching circuit part included in the cable-like antenna 40 of FIG. 11A.

The basket with a reader device according to the first embodiment is different from the basket with a reader device according to the first embodiment in that the ground radiation type cable-like antenna 40 is used as a cable-like antenna of a reader device forming the basket with a reader device. In contrast to the leaky coaxial cable antenna, contrary to the case shown in FIG. 3A, this ground radiation type cable-like antenna 40 has a larger communication distance (readable area) on the tip side (matching device side) than the power feeding side. Therefore, since the articles in the basket main body are distributed densely at the bottom and coarsely on the upper side, the ground radiation type cable-like antenna is preferably wound downward from the top to the bottom of the basket main body 1.

<Grand Radiation Type Cable-Like Antenna>

As shown in FIG. 10A, the ground radiation type cable-like antenna 40 includes a cable-like main body part 41 made up of a coaxial cable. The cable-like main body part 41 has an internal conductor 44 and an external conductor 45 disposed along the internal conductor 44. The ground radiation type cable-like antenna 40 has a matching circuit part 50 disposed at one end portion of the cable-like main body part 41, and a magnetic body 46 disposed along an outer circumferential surface of the external conductor 45 at a position away from the one end portion of the cable-like main body part 41.

The matching circuit part 50 functions to match the impedance of the internal conductor 44 with the impedance of the external conductor 45. As shown in FIG. 10B, the internal conductor 44 and the external conductor 45 are connected through the matching circuit part 50.

As shown in FIGS. 11A and 11B, the matching circuit part 50 includes a planar first conductor layer 51 connected to the internal conductor 44, via hole conductors 52, and a planar second conductor layer 53. The first conductor layer 51 and the second conductor layer 53 have a width larger than the outer diameter of the external conductor 45 and extend along the extending direction of the internal conductor 44. The first conductor layer 51 and the second conductor layer 53 are disposed to face each other across an insulator 54 and are connected to each other by the two via-hole conductors 52. The second conductor layer 53 is formed longer than the first conductor layer 51 in terms of the length in the extending direction of the cable-like main body part 41. As a result, a portion of the second conductor layer 53 and the external conductor 45 are disposed to face each other across the insulator 54. In FIG. 11B, to show both the via hole conductors 52 and the internal conductor 44 in a cross section, a cutting plane is shifted along the way for convenience as indicated by the line A-A of FIG. 11A.

The internal conductor 44 is electrically connected to the first conductor layer 51. The first conductor layer 51 is electrically connected to the second conductor layer 53 through the two via hole conductors 52. The second conductor layer 53 is connected to the external conductor 45 by a capacitive coupling having a capacitor component 55 through the insulator 54. Therefore, as shown in FIG. 11C, the internal conductor 44 and the external conductor 45 are connected through the matching circuit part 50 having the capacitor component 55 and an inductor component 56.

The magnetic body 46 is made of ferrite, for example. The magnetic body 46 functions to divide the ground radiation type cable-like antenna 40 into a radiating part 47 communicating with the RFID tag and a non-radiating part 48 not communicating with the RFID tag. Therefore, the radiating part 47 extends from the end portion of the cable-like main body part 41 to the magnetic body 46. The non-radiating part 48 extends from the magnetic body 46 to the other end portion of the cable-like main body part 41. The non-radiating part 48 functions as a shield member. The other end portion of the cable-like main body part 41 is connected to a power feeding part 43. The external conductor 45 is connected to the ground for electric stability.

The ground radiation type cable-like antenna 40 is an antenna utilizing a standing wave generated in the external conductor 45 and is not a so-called loop antenna. The detection area (radio wave area) of the ground radiation type cable-like antenna 40 is limited to within about 1 m. Even when a metal body or a magnetic body is present near the ground radiation type cable-like antenna 40, the frequency characteristics are not significantly changed. Even when the ground radiation type cable-like antenna 40 is bent, no interference etc. occur between bent portions. Therefore, the ground radiation type cable-like antenna 40 can relatively freely arranged two-dimensionally or three-dimensionally.

The present disclosure includes appropriately combining arbitrary embodiments and/or examples out of the various embodiments and/or examples described above, and the effects of the respective embodiments and/or examples can be produced.

According to the basket with a reader device of the present invention, since the cable-like antenna is used, a tagged item in the basket such as a shopping basket is easily read. Therefore, an article management system can be constructed by using this basket with a reader device.

EXPLANATIONS OF LETTERS OR NUMERALS 1 basket main body
2, 2a, 2b RFIC element
3, 3a, 3b, 3c, 3d, 3e cable-like antenna (leaky coaxial cable antenna)
4 control part
5, 5a, 5b WiFi slave device (wireless LAN slave device)
6, 6a, 6b WiFi antenna
7 battery
8a, 8b, 8c, 8d, 8e surfaces (side and bottom surfaces) forming the basket main body
9 outlet opening (opening portion)
10, 10a, 10b, 10c, 10d, 10e reader device
11, 11a, 11b, 11c RFID tag
12, 12a, 12b, 12c article (item)
14 power feeding end
16 terminator
18 wireless reachable area
20, 20a, 20b, 20c, 20d, 20e basket with a reader device
21 center conductor
22 insulator
23 external conductor
24 opening portion
25 radio wave
26 sheath
30 master communication module
32, 32a, 32b wireless LAN master device
34 host computer
40 cable-like antenna (ground radiation type)
41 cable-like main body part
43 power feeding part
44 internal conductor
45 external conductor
46 magnetic body
47 radiating part
48 non-radiating part
50 matching circuit part
51 first conductor layer
52 via hole conductor
53 second conductive layer
54 insulator
55 capacitor component
56 inductor component
100 RFIC chip
101a, 101b antenna element
102 cover material

What is claimed:

1. A basket with a reader device for communicating data relating to articles placed therein, the basket comprising:
a main body configured to receive at least one article including an RFID tag having a dipole antenna attached thereto; and
a reader device disposed on the main body and configured to read the RFID tag, the reader device including:
an RFIC element; and
a cable-like antenna having one end connected to the RFIC element, wherein the cable-like antenna is a ground radiation type cable-like antenna that is disposed in a circling manner around an axis passing through an opening of the main body of the basket.

2. The basket according to claim 1, wherein the cable-like antenna extends from a surface of the main body on which the RFIC element is disposed over another surface of the main body that is different from the surface having the RFIC element.

3. The basket according to claim 1, wherein the cable-like antenna is further disposed on a bottom surface of the main body of the basket that faces the opening.

4. The basket according to claim 1,
wherein the main body of the basket includes a receiving portion configured to receive the at least one article through the opening of the main body, and
wherein the cable-like antenna is helically disposed about the receiving portion.

5. The basket according to claim 1, wherein the cable-like antenna includes a signal line having one end connected to the RFIC element, a ground disposed along the signal line and having openings disposed at intervals along the signal line with the signal line exposed outside the openings, and a terminator disposed at a second end.

6. The basket according to claim 1, wherein the cable-like antenna includes a signal line having one end connected to the RFIC element, a ground disposed along the signal line, and a matching device disposed at a second end and connected between the signal line and the ground.

7. The basket according to claim 6, further comprising a magnetic body disposed on the cable-like antenna that is configured to divide the cable-like antenna into a radiation portion configured to communicate data with the RFID tag and a non-radiation portion configured as shield member.

8. The basket according to claim 1, further comprising:
a basket-side short-range wireless communication device connected to the reader device,
wherein the basket-side short-range wireless communication device is configured to communicate with an external-side short-range wireless communication device.

9. The basket according to claim 8, wherein the basket-side short-range wireless communication device is a short-range wireless communication system configured to transmit data in one of the UHF band or the SHF band and is configured to communicate with the external-side short-range wireless communication device.

10. The basket according to claim 1, wherein the cable-like antenna is configured emit radio waves in a plurality of directions to communicate data with the RFID tag.

11. The basket according to claim 1, wherein the cable-like antenna is configured in a circling manner adjacent to the opening of the main body of the basket.

12. An article management system comprising:
an external-side short-range wireless communication device;
a host computer communicatively coupled to the external-side short-range wireless communication device; and
a basket having a reader device for communicating data relating to articles placed therein, the basket including:
a main body configured to receive at least one article including an RFID tag having a dipole antenna attached thereto;
a reader device disposed on the main body of the basket and configured to read the RFID tag; and
a basket-side short-range wireless communication device connected to the reader device and configured to communicate with the external-side short-range wireless communication device,
wherein the reader device includes:
an RFIC element; and
a cable-like antenna having one end connected to the RFIC element, the cable-like antenna being a ground radiation type cable-like antenna that is configured in a circling manner around an axis passing through an opening of the main body of the basket,
wherein the RFID tag of the at least one article placed in the basket is configured to transmit information relating to the at least one article through an RFID system formed by the RFID tag and the cable-like antenna and a short-range wireless communication system formed by the external-side short-range wireless communication device and the basket-side short-range wireless communication device to the host computer.

13. The article management system according to claim 12, wherein the cable-like antenna is configured in a circling manner adjacent to the opening of the main body of the basket.

14. The article management system according to claim 12, wherein the cable-like antenna extends from a surface of the main body on which the RFIC element is disposed over another surface of the main body that is different from the surface having the RFIC element.

15. The article management system according to claim 12, wherein the cable-like antenna is further disposed on a bottom surface of the main body of the basket that faces the opening.

16. The article management system according to claim 12,
wherein the main body of the basket includes a receiving portion configured to receive the at least one article through the opening of the main body, and
wherein the cable-like antenna is helically disposed about the receiving portion.

17. The article management system according to claim 12, wherein the cable-like antenna includes a signal line having one end connected to the RFIC element, a ground disposed along the signal line and having openings disposed at intervals along the signal line with the signal line exposed outside the openings, and a terminator disposed at a second end.

18. The article management system according to claim 12, wherein the cable-like antenna includes a signal line having one end connected to the RFIC element, a ground disposed along the signal line, and a matching device disposed at a second end and connected between the signal line and the ground.

19. The article management system according to claim 18, further comprising a magnetic body disposed on the cable-like antenna that is configured to divide the cable-like antenna into a radiation portion configured to communicate data with the RFID tag and a non-radiation portion configured as shield member.

20. The article management system according to claim 12, wherein the cable-like antenna is configured emit radio waves in a plurality of directions to communicate data with the RFID tag.

* * * * *